US012581274B2

(12) United States Patent
Bicudo et al.

(10) Patent No.: US 12,581,274 B2
(45) Date of Patent: Mar. 17, 2026

(54) PORTABLE COMMUNICATION DEVICE

(71) Applicant: MOTOROLA SOLUTIONS, INC., Chicago, IL (US)

(72) Inventors: Felippe Morais Bicudo, Lighthouse Point, FL (US); Lanting L Garra, Sunrise, FL (US); Ryan M Nilsen, Plantation, FL (US); Soon Hin Lee, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 322 days.

(21) Appl. No.: 18/466,247

(22) Filed: Sep. 13, 2023

(65) Prior Publication Data

US 2024/0121579 A1    Apr. 11, 2024

Related U.S. Application Data

(60) Provisional application No. 63/414,094, filed on Oct. 7, 2022.

(51) Int. Cl.
*H04W 4/10* (2009.01)
*G08B 5/36* (2006.01)

(52) U.S. Cl.
CPC ................ *H04W 4/10* (2013.01); *G08B 5/36* (2013.01)

(58) Field of Classification Search
CPC .................................... H04W 4/10; G08B 5/36
See application file for complete search history.

(56) References Cited

U.S. PATENT DOCUMENTS

| | | | | |
|---|---|---|---|---|
| 7,502,609 | B2 * | 3/2009 | Kayzar | H04M 3/42153 |
| | | | | 455/418 |
| 8,351,868 | B2 * | 1/2013 | Garra | H04M 1/724 |
| | | | | 455/159.1 |
| 9,158,496 | B2 * | 10/2015 | Soffer | G06F 21/83 |
| 10,635,173 | B2 * | 4/2020 | Lim | H04L 63/0861 |
| 11,019,947 | B2 * | 6/2021 | Shendelman | A63H 33/18 |
| 11,522,982 | B2 * | 12/2022 | Kuperstein | H04M 1/724 |
| D974,214 | S * | 1/2023 | McManigal | D10/118 |
| D997,898 | S * | 9/2023 | Shepher | D14/137 |

(Continued)

FOREIGN PATENT DOCUMENTS

WO    WO-2024076475 A1 *    4/2024    ............. H04M 1/04

OTHER PUBLICATIONS

Savox Communications: "C-C.440 COM-Control Unit", May 15, 2021 (May 15, 2021), XP093102096, Retrieved from the Internet: URL:https://www.radiotrans.com/storage/app/media/catalogos/lb925-savoxcc440datasheetenvl.0.pdf [retrieved on Nov. 15, 2023] the whole document.

*Primary Examiner* — Hai V Nguyen
(74) *Attorney, Agent, or Firm* — Raguraman Kumaresan

(57) ABSTRACT

A portable communication device includes a housing and a push-to-talk button. The push-to-talk (PTT) button is disposed on the front surface of the housing and further occupies a substantial portion of the front surface of the housing. The portable communication device also includes a light emitting diode (LED) stripe that is disposed on the PTT button. The LED stripe is placed on a flexible cable to allow the LED stripe and the PTT button to be moved together when any portion of the front surface of the housing containing the LED stripe and the PTT button is activated. The PTT button is configured to activate transmission of a PTT signal on a talk group channel when the PTT is activated.

17 Claims, 6 Drawing Sheets

(56)     References Cited

U.S. PATENT DOCUMENTS

| | | | | |
|---|---|---|---|---|
| D1,003,295 S | * | 10/2023 | Sharma | D14/434 |
| D1,005,369 S | * | 11/2023 | Rao | D16/203 |
| D1,008,227 S | * | 12/2023 | Kamada | D14/218 |
| D1,053,804 S | * | 12/2024 | Su | D13/108 |
| 2004/0004559 A1 | * | 1/2004 | Rast | G06F 3/0233 |
| | | | | 341/22 |
| 2005/0227738 A1 | * | 10/2005 | Ono | H01H 13/83 |
| | | | | 455/566 |
| 2006/0211385 A1 | * | 9/2006 | Kayzar | H04M 3/42153 |
| | | | | 455/90.3 |
| 2007/0065357 A1 | * | 3/2007 | Chien | H04W 4/10 |
| | | | | 423/518 |
| 2008/0153531 A1 | * | 6/2008 | O'Shaughnessy | H04L 67/54 |
| | | | | 455/518 |
| 2011/0124383 A1 | * | 5/2011 | Garra | H04M 1/724 |
| | | | | 340/815.4 |
| 2015/0180567 A1 | * | 6/2015 | Apostolakos | H04L 65/1069 |
| | | | | 370/316 |
| 2016/0012445 A1 | * | 1/2016 | Villa-Real | G06Q 20/4016 |
| | | | | 705/44 |
| 2018/0182382 A1 | * | 6/2018 | Lee | G10L 25/78 |
| 2018/0197546 A1 | * | 7/2018 | Kim | G10L 17/02 |
| 2018/0204445 A1 | * | 7/2018 | Bereshchanskiy | A44C 9/00 |
| 2018/0232739 A1 | * | 8/2018 | Battle | G06Q 20/0655 |
| 2019/0069078 A1 | * | 2/2019 | Johnson | H04R 1/025 |
| 2019/0155385 A1 | * | 5/2019 | Lim | G06F 3/033 |
| 2019/0380518 A1 | * | 12/2019 | Shendelman | A47G 19/025 |
| 2020/0111625 A1 | * | 4/2020 | Ng | H01H 13/10 |
| 2020/0152188 A1 | * | 5/2020 | Lee | G10L 15/22 |
| 2021/0029251 A1 | * | 1/2021 | Rathnam | H04M 3/53341 |
| 2021/0244212 A1 | * | 8/2021 | Shendelman | A47G 19/025 |
| 2022/0398591 A1 | * | 12/2022 | Battle | H04L 9/50 |
| 2024/0121331 A1 | * | 4/2024 | Bicudo | H04M 1/026 |
| 2024/0420142 A1 | * | 12/2024 | Battle | G06Q 20/0655 |

* cited by examiner

100

PORTABLE COMMUNICATION DEVICE

BACKGROUND

Push-to-talk (PTT) handsets have been used for some time by emergency personnel but also have recently begun to grow in general popularity. PTT handsets contain a PTT button that enables the user to communicate with a group of users on the same channel. In existing handsets, the PTT button is located on a side surface. However, in some situations, for example, when the handsets are worn on the body of users (e.g., users operating in retail and hospitality environments), it may not be convenient for such users to operate a PTT button that is located on a side surface.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
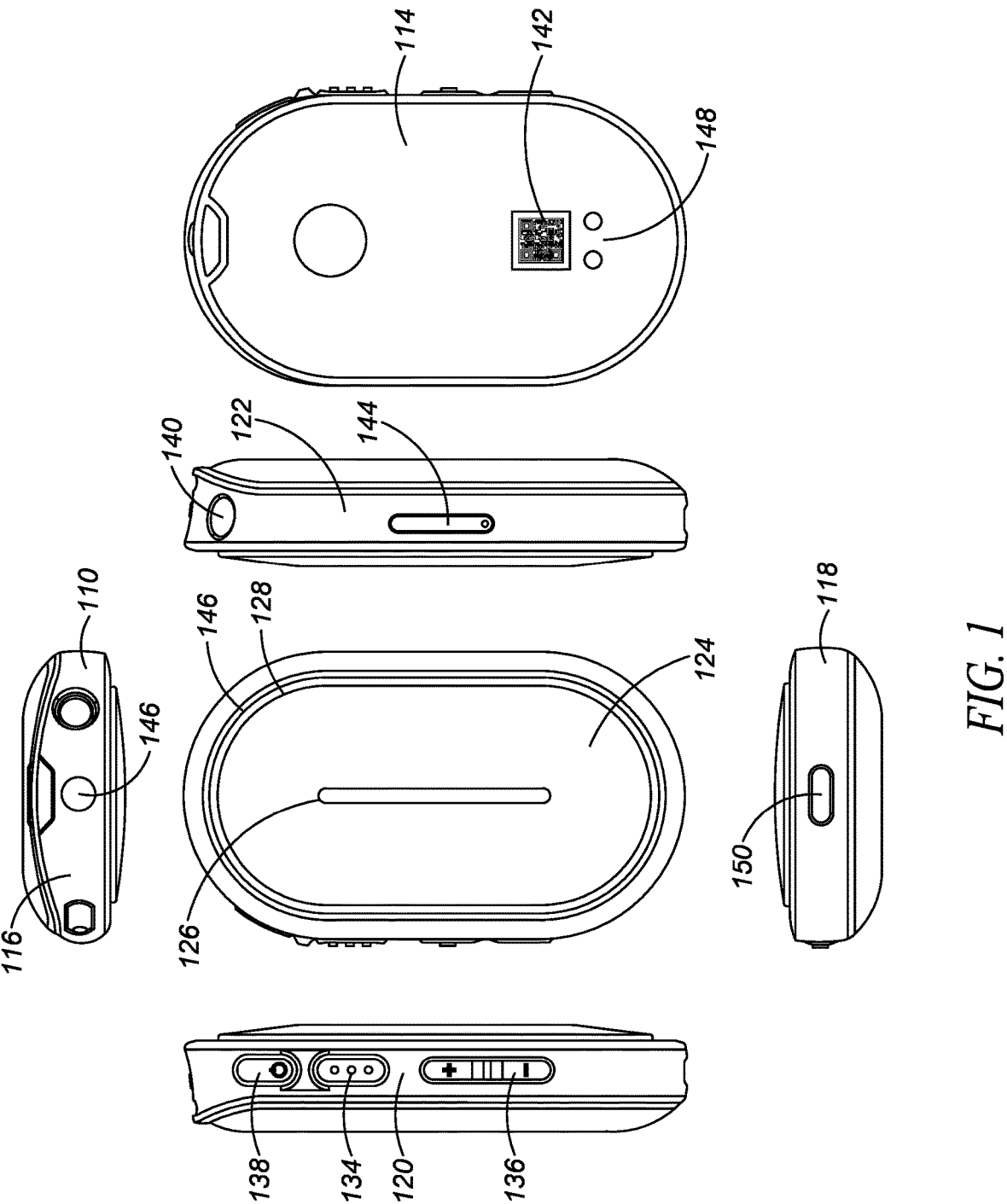
FIG. 1 illustrates front, rear, top, bottom, left-side, and right-side views of a portable communication device in accordance with some embodiments.
Figure 2:
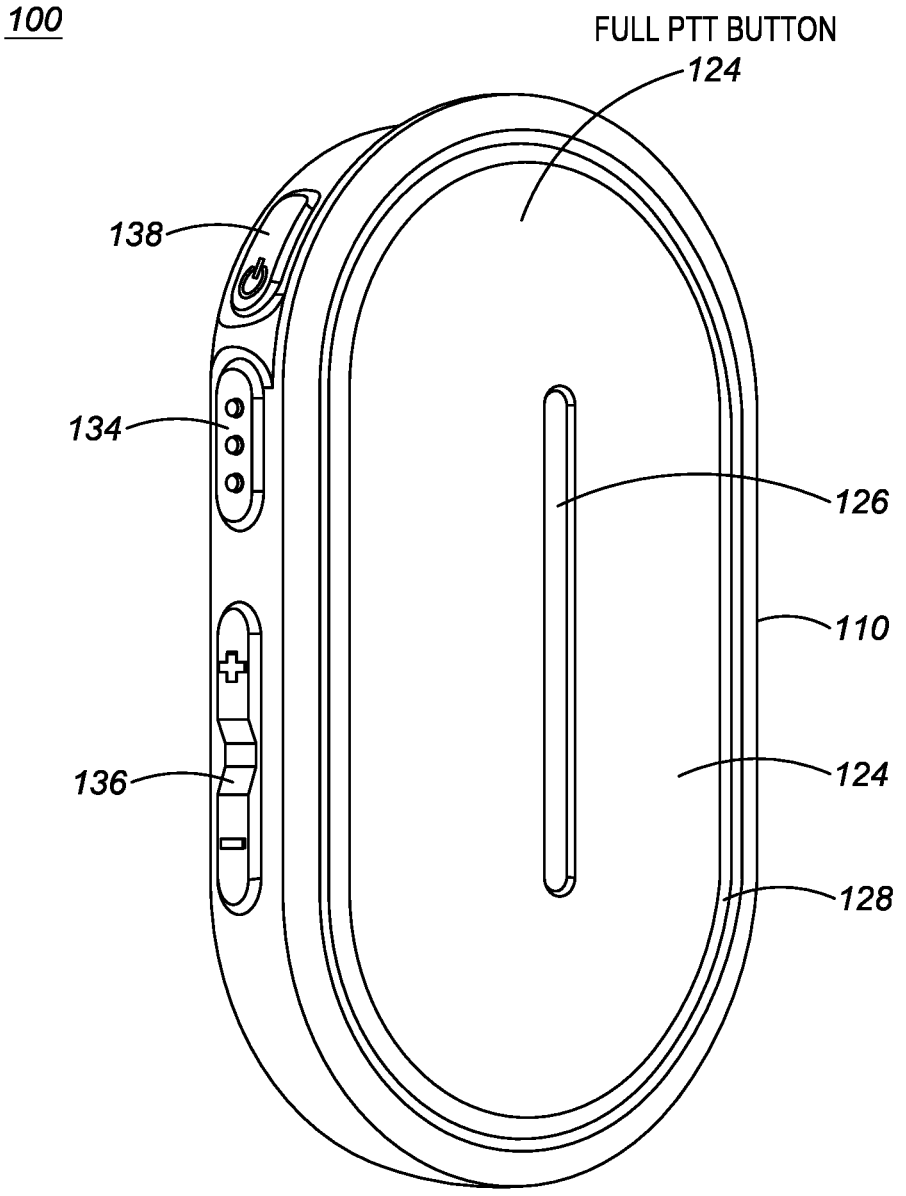
FIG. 2 illustrates a front perspective view of the portable communication device in accordance with some embodiments.
Figure 3:
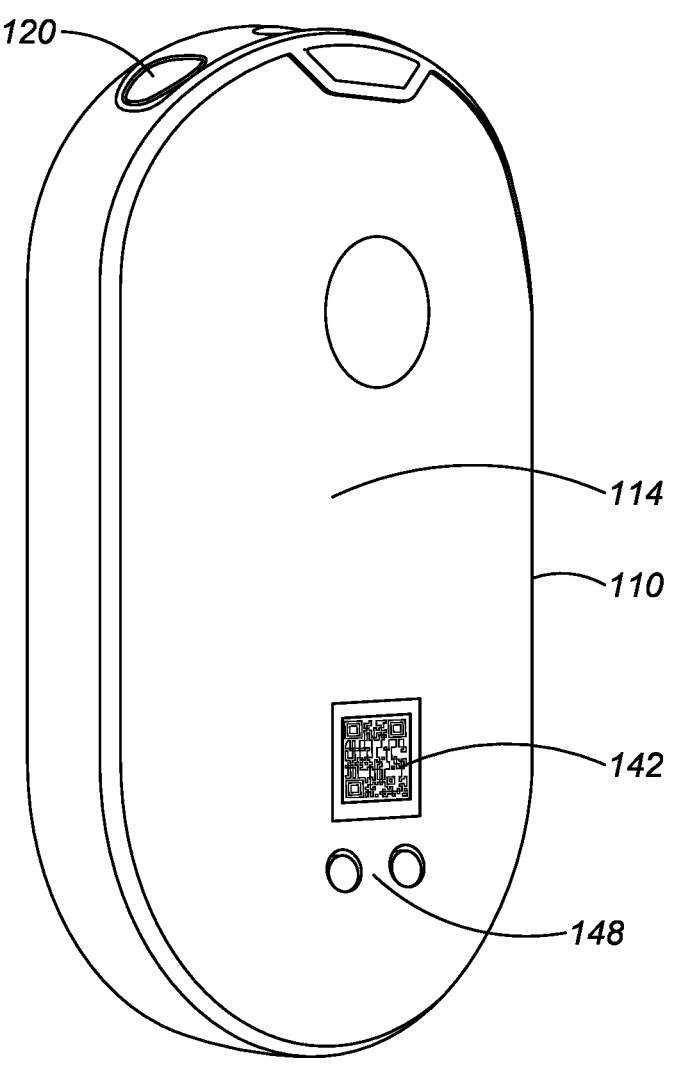
FIG. 3 illustrates a rear perspective view of the portable communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

One embodiment provides a portable communication device, comprising: a housing, the housing including a front surface; and a push-to-talk (PTT) button disposed on the front surface of the housing, the PTT button occupying a substantial portion of the front surface of the housing.

The above embodiment will be discussed in more detail below. Further advantages and features consistent with this disclosure will be set forth in the following detailed description, with reference to the figures.

Referring now to FIGS. 1-7, a portable communication device 100 is shown. The portable communication device 100 includes a housing 110 with multiple surfaces including a front surface 112, a rear surface 114, a top surface 116, a bottom surface 118, a left-side surface 120, and a right-side surface 122. The front surface 112 of the housing 110 includes a push-to-talk (PTT) button 124 (also referred to as a full-front PTT button) and a light emitting diode (LED) stripe 126 disposed on the PTT button 124. In accordance with embodiments, the PTT button 124 is large enough to substantially occupy the front surface 112 of the housing 110. As shown in FIGS. 1-6, the PTT button 124 occupies a substantial portion of the front surface 112 of the housing 110. In one embodiment, the PTT button 124 is configured to occupy at least 75% of the front surface 112 of the housing 110. In another embodiment, the PTT button 124 is configured to occupy at least 90% of the button surface.

The PTT button 124 is configured to activate transmission of a PTT signal (e.g., when operating in half-duplex communication mode) on a selected talk group channel when the PTT button 124 is depressed. In accordance with embodiments, any portion of the PTT button 124 located on the front surface of the housing can be depressed to activate PTT transmission. As an example, the PTT button 124 is configured to be activable across the entirety of the PTT button 124 surface.

Figure 4:
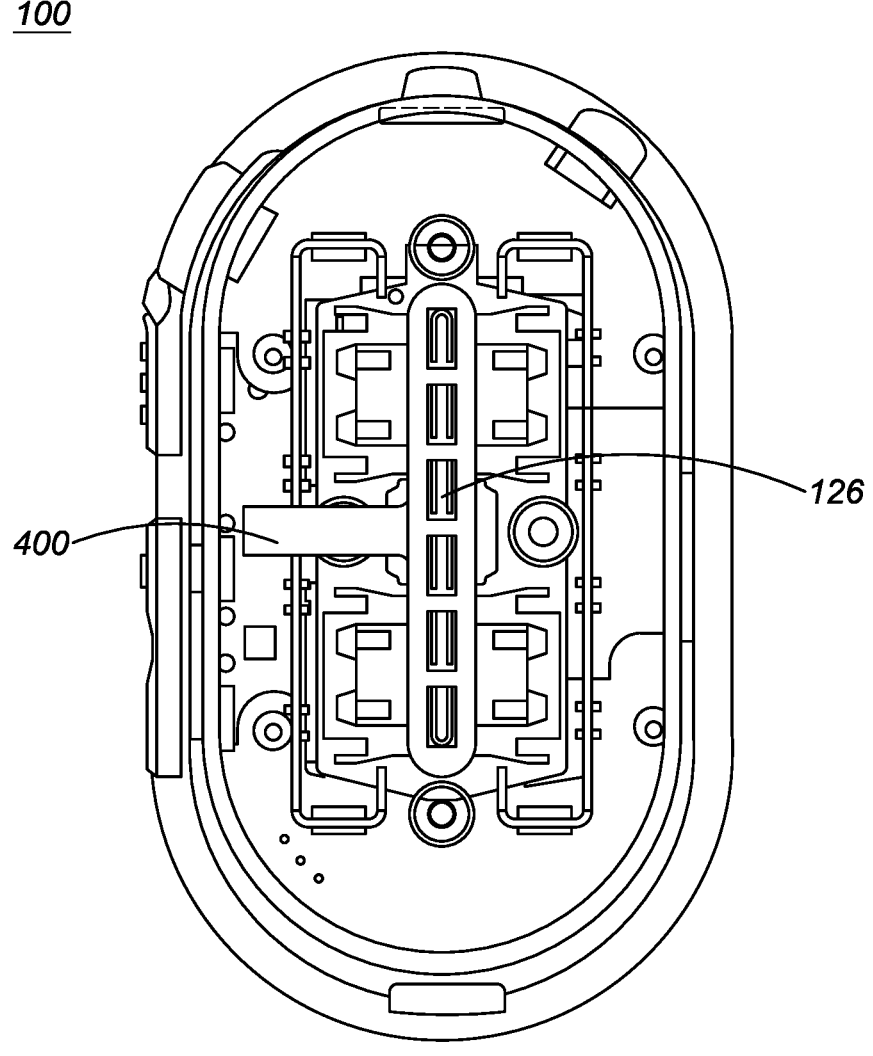
FIG. 4 illustrates a cross-sectional view of the portable communication device in accordance with some embodiments.
Figure 5:
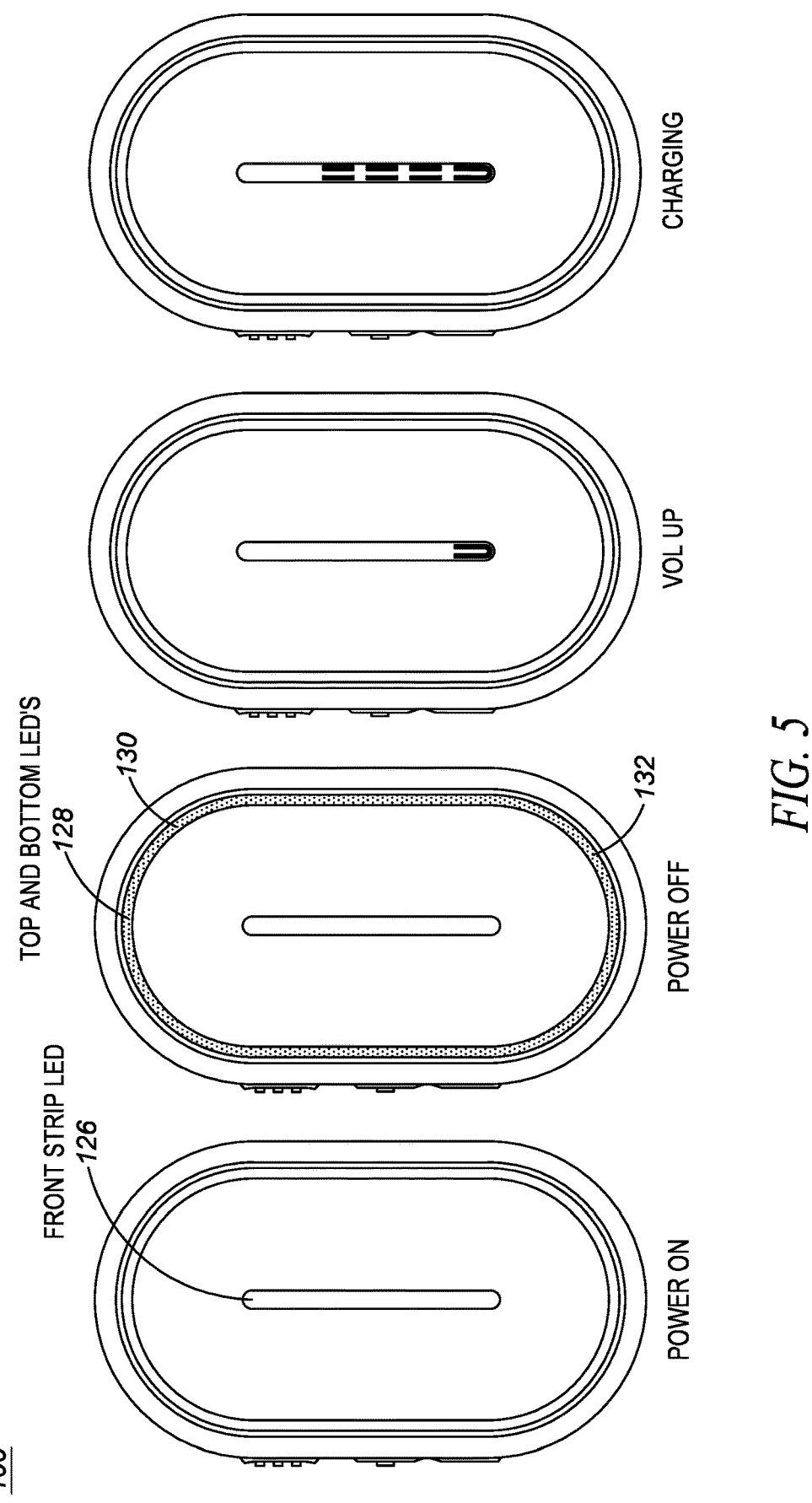
FIG. 5 illustrates different applications of light emitting diode components disposed at the portable communication device in accordance with some embodiments.

The portable communication device 100 includes a light emitting diode (LED) stripe 126 disposed on the PTT button 124. In accordance with some embodiments, as shown in FIG. 4, the LED stripe 126 is placed on a flexible cable 400 (see FIG. 4) connecting to a rigid printed circuit board (PCB) disposed in the housing 110 so as to move the LED stripe 126 together with the PTT button 124 when any portion of the front surface 112 of the housing 110 containing the LED stripe 126 and the PTT button 124 is depressed. In these embodiments, a user can also depress the LED stripe 126 disposed on the front surface 112 of the housing 110 to activate PTT transmission. The LED stripe 126 is configured to be activated to provide a feedback indication comprising at least one of: battery status, connectivity status, volume status, and startup and turn off sequence status. In FIG. 5, the LED stripe 126 is shown as indicating volume/charging status.

The portable communication device 100 further comprises a translucent light emitting diode (LED) ring 128 arranged peripheral to the PTT button 124 on the front surface of the housing 110. The LED ring 128 comprises LED elements 130, 132 configured to be activated to provide a feedback indication comprising at least one of: channel status, call status, transmission and reception status, and charging status. As shown in FIG. 5, the LED ring 128 may include LED elements 130, 132, respectively placed around top and bottom portions of the ring 128 to indicate the power on/off status.

The portable communication device 100 further comprises a voice command button 134, a volume adjustment button 136, a power button 138, and an emergency button 140. The voice command button 134 and the volume adjustment button 136 are disposed on the left-side surface 120 of the housing 110. The power button 138 and the emergency button 140 may be disposed on the top surface 116 of the housing 110. In accordance with embodiments, when the emergency button 140 is depressed, the portable communication device 100 automatically sends an emergency signal over a pre-programmed frequency channel, for example, by reception by dispatch center and other communication devices. In accordance with some embodiments, the portable communication device 100 further includes a slot 142 disposed on the rear surface 114 of the housing 110. The slot 142 is adapted to display a quick response (QR) code or other suitable scannable code that can be used to provide one or more ownership experiences (e.g., device enrollment) to a user of the portable communication device 100. The portable communication device 100 also includes a slot 144 on the right-side surface 122 of the housing 110. The slot 144 may be adapted to receive a subscriber identification module (SIM).

The portable communication device 100 further includes an accessory connector interface 146 that is adapted to connect the portable communication device to a wired audio accessory such as a remote speaker microphone (RSM), or other remote audio accessory. The accessory connector interface 146 is disposed on a bottom surface 118 of the housing 110. The portable communication device 100 further comprises one or more charging pins 148 disposed on a rear surface 114 of the housing 110. The portable communication device 100 includes a charging connector interface 150 (e.g., USB-C interface) disposed on the bottom surface 118 of the housing 110.

Figure 6:
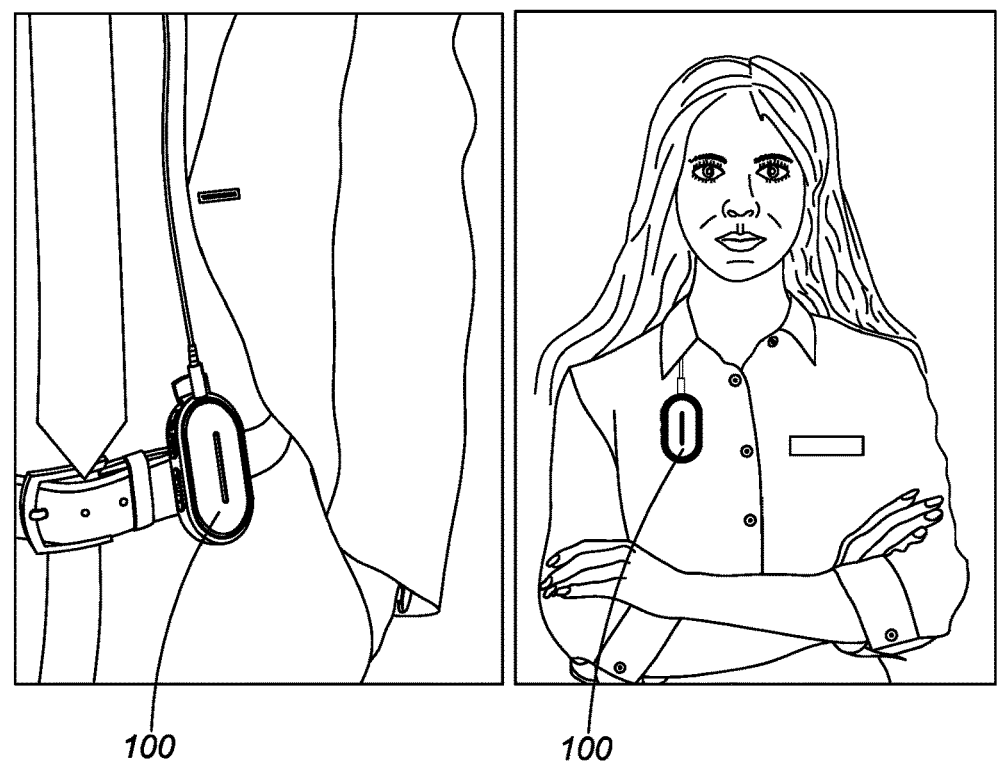
FIG. 6 illustrates examples of different wearable modes of operation associated with the portable communication device in accordance with some embodiments.

In accordance with embodiments, the rear surface 114 of the portable communication device 100 is configured to mount to clothing and/or a fixed surface. As shown in FIG. 6, the portable communication device 100 may be worn on the belt or the chest to offer better ergonomics to users (e.g., users operating in retail and hospital environments). When worn on the belt, the portable communication device 100 can be attached to a belt clip holster accessory.

Figure 7:
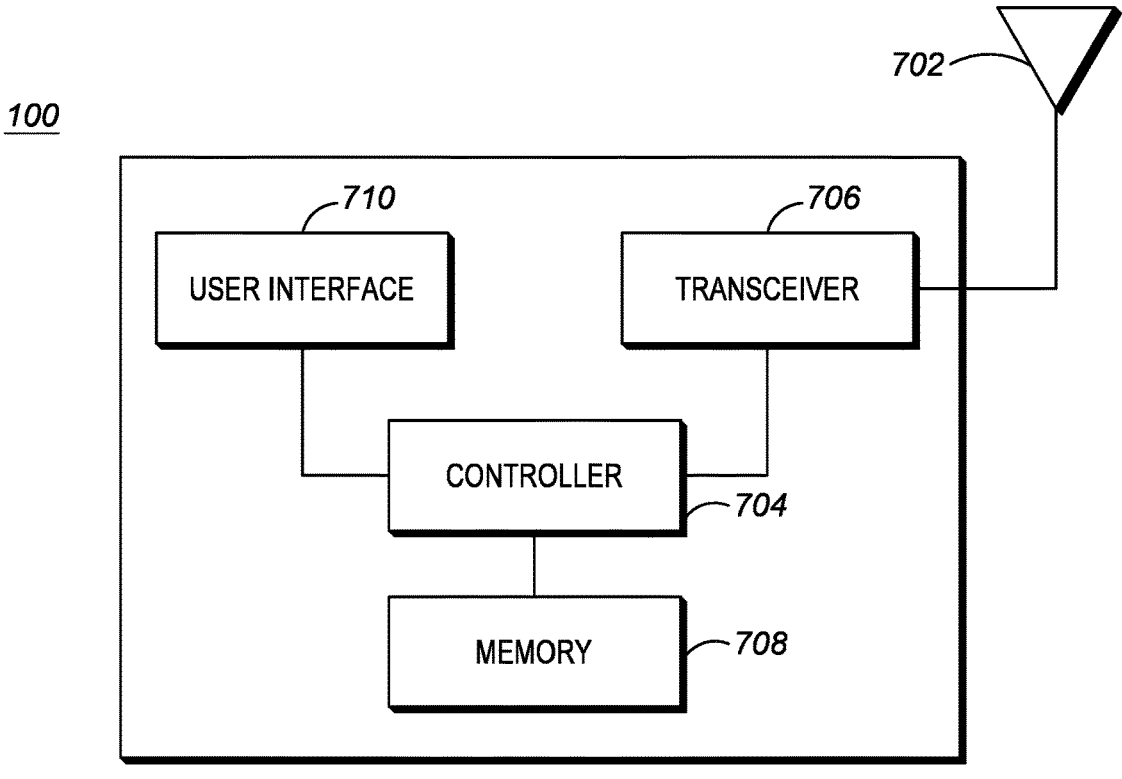
FIG. 7 is a block diagram of the portable communication device in accordance with some embodiments.

FIG. 7 is a block diagram illustrating the internal components of the portable communication device 100 in accordance with some embodiments of the invention. The components include an antenna 702, a controller 704, a transceiver 706, a memory 708, and a user interface 710. The user interface 710 may include one or more of the PTT button 124, voice command button 134, and emergency button 140. In accordance with the embodiment, the antenna 702 comprises any known or developed structure for radiating and receiving electromagnetic energy in the frequency range containing the wireless carrier frequencies. The antenna 702 is used for transmitting radio signal over one or more pre-programmed channels allocated for PTT communication.

In accordance with the embodiment, the transceiver 706 coupled to the controller 704 enables the portable communication device 100 to transmit and receive the RF signals through the antenna 702. In accordance with the embodiment, the transceiver 706 converts the RF signals received from the antenna 702 to digital data for use by the controller 704.

In accordance with the embodiment, the controller 704 is coupled to the transceiver 706, the memory 708, and the user interface 710. The controller 704 operates in conjunction with the data and instructions stored in the memory 708 to control the operation of the portable communication device 100. The controller 704 may be implemented as a processor, a digital signal processor, hard-wired logic and analog circuitry, or any suitable combination of these.

In accordance with the embodiment, the memory 708 is coupled to the controller 704 to store data and instructions for the operation of the controller 704. The memory 708 maintains a database that stores the information about talk-group channels that can be used by the portable communication device 100 for PTT communication.

In accordance with the embodiment, the user interface 710 coupled to the controller 704 detects when the PTT button 124 is pressed and in response sends a control signal to the controller 704 to activate the transmission of PTT signals on a talk group channel via the transceiver 706.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field program-mable gate arrays (FPGAs) and unique stored program instructions (including both software and firmware) that control the one or more processors to implement, in con-junction with certain non-processor circuits, some, most, or all of the functions of the method and/or apparatus described herein. Alternatively, some or all functions could be imple-mented by a state machine that has no stored program instructions, or in one or more application specific integrated circuits (ASICs), in which each function or some combina-tions of certain of the functions are implemented as custom logic. Of course, a combination of the two approaches could be used.

Moreover, an embodiment can be implemented as a computer-readable storage medium having computer read-able code stored thereon for programming a computer (e.g., comprising a processor) to perform a method as described and claimed herein. Any suitable computer-usable or com-puter readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in con-nection with the instruction execution system, apparatus, or device.

Further, it is expected that one of ordinary skill, notwith-standing possibly significant effort and many design choices motivated by, for example, available time, current technol-ogy, and economic considerations, when guided by the concepts and principles disclosed herein will be readily capable of generating such software instructions and pro-grams and ICs with minimal experimentation. For example, computer program code for carrying out operations of various example embodiments may be written in an object oriented programming language such as Java, Smalltalk, C++, Python, or the like. However, the computer program code for carrying out operations of various example embodi-ments may also be written in conventional procedural pro-gramming languages, such as the "C" programming lan-guage or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Inter-net Service Provider).

The Abstract of the Disclosure is provided to allow the reader to quickly ascertain the nature of the technical dis-closure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable communication device, comprising:
a housing, the housing including a front surface;
a push-to-talk (PTT) button disposed on the front surface of the housing, the PTT button occupying at least 75% of the front surface of the housing.

2. The portable communication device of claim 1, wherein the PTT button is configured to activate transmis-sion of a PTT signal on a talk group channel when the PTT button is depressed.

3. The portable communication device of claim 1, further comprising a light emitting diode (LED) stripe disposed on the PTT button.

4. The portable communication device of claim 3, wherein the LED stripe is configured to be activated to provide a feedback indication comprising at least one of: battery status, connectivity status, volume status, startup and turn off sequence status.

5. The portable communication device of claim 4, wherein the LED stripe is placed on a flexible cable con-necting to a rigid PCB board disposed in the housing so as to move together with the PTT button when the PTT button is activated.

6. The portable communication device of claim 1, further comprising a translucent light emitting diode (LED) ring arranged peripheral to the PTT button on the front surface of the housing.

7. The portable communication device of claim 6, wherein the LED ring comprises one or more LED elements configured to be activated to provide a feedback indication comprising at least of: channel status, call status, transmis-sion and reception status, and charging status.

8. The portable communication device of claim 1, further comprising:
a physical voice command button configured to activate a voice command function;
a volume adjustment button;
a power button; and
an emergency button.

9. The portable communication device of claim 8, wherein the voice command button and the volume adjust-ment button are disposed on a left-side surface of the housing.

10. The portable communication device of claim 8, wherein the power button and the emergency button are disposed on a top surface of the housing.

11. The portable communication device of claim 1, further comprising:
an accessory connector adapted to connect the portable communication device to an audio accessory.

12. The portable communication device of claim 11, wherein the accessory connector is disposed on a top surface of the housing.

13. The portable communication device of claim 1, fur-ther comprising:

one or more charging pins disposed on a rear surface of the housing.

14. The portable communication device of claim 1, further comprising:

a slot disposed on a rear surface of the housing, the slot adapted to display a quick response (QR) code.

15. The portable communication device of claim 1, wherein:

the PTT button further configured to occupy at least 90% of the front surface of the housing.

16. The portable communication device of claim 1, wherein:

the PTT button further configured to be activable across the entirety of the button surface.

17. The portable communication device of claim 1, wherein:

the housing further including a rear surface configured to mount to clothing and/or a fixed surface.

\* \* \* \* \*